(12) United States Patent
Lefevre et al.

(10) Patent No.: US 8,145,540 B2
(45) Date of Patent: Mar. 27, 2012

(54) MANAGEMENT PLATFORM AND ASSOCIATED METHOD FOR MANAGING SMART METERS

(75) Inventors: Catherine Lefevre, Corroy-le-Chateau (BE); Christophe Closset, Retinne (BE); Martin Dermot Whelan, Melbourne (AU); Michel Genette, La Bruyere (BE); Pierre Joseph Henri Adrien Close, Esneux (BE); Sébastien Roland E. Determe, Braine I'Alleud (BE); Dieter Kopp, Illingen (DE); John Peter Rawdon Johnson, Aylesbury (GB); Jacobus Antheunisse, Nootdorp (NL)

(73) Assignee: Alcatel Lucent, Paris (FR)

( * ) Notice: Subject to any disclaimer, the term of this patent is extended or adjusted under 35 U.S.C. 154(b) by 421 days.

(21) Appl. No.: 12/393,643

(22) Filed: Feb. 26, 2009

(65) Prior Publication Data
US 2009/0222828 A1     Sep. 3, 2009

(30) Foreign Application Priority Data
Feb. 28, 2008   (EP) ..................................... 08290198

(51) Int. Cl.
*G06Q 30/00*    (2006.01)
(52) U.S. Cl. ..................... 705/26.5; 705/26.9; 705/26.4; 705/1.1; 705/7.25; 705/7.27
(58) Field of Classification Search ................. 705/7.22, 705/7.23, 7.24, 7.25, 7.26, 7.27, 412, 413, 705/26.4, 26.5, 26.8, 26.9, 1.1; 718/102, 718/103; 379/106.03; 340/870.02, 870.03; 709/223, 227
See application file for complete search history.

(56) References Cited

U.S. PATENT DOCUMENTS

| | | | |
|---|---|---|---|
| 5,894,422 A | 4/1999 | Chasek | |
| 6,014,089 A | 1/2000 | Tracy et al. | |
| 6,751,562 B1 * | 6/2004 | Blackett et al. | ................. 702/61 |
| 7,280,893 B2 * | 10/2007 | Spool et al. | ................... 700/291 |
| 7,467,198 B2 * | 12/2008 | Goodman et al. | ............ 709/223 |
| 7,761,337 B2 * | 7/2010 | Caballero et al. | ............ 705/26.4 |
| 2003/0204756 A1 * | 10/2003 | Ransom et al. | ............... 713/300 |
| 2006/0036795 A1 | 2/2006 | Leach | |
| 2007/0136217 A1 | 6/2007 | Johnson et al. | |
| 2008/0052253 A1 * | 2/2008 | Edwards et al. | .............. 705/412 |
| 2009/0046675 A1 * | 2/2009 | Pratt et al. | ..................... 370/337 |
| 2009/0193057 A1 * | 7/2009 | Maes | ............................ 707/200 |
| 2010/0049568 A1 * | 2/2010 | Louie et al. | ....................... 705/8 |

OTHER PUBLICATIONS

European Search Report.

* cited by examiner

*Primary Examiner* — Igor Borissov
(74) *Attorney, Agent, or Firm* — Fay Sharpe LLP (57) ABSTRACT

The present invention relates to a management platform for monitoring and managing one or more smart meters. The management platform comprises means for communicating with smart meters and a workflow handler for executing a workflow. A workflow specifies a process for management of the smart meters.

20 Claims, 2 Drawing Sheets

MANAGEMENT PLATFORM AND ASSOCIATED METHOD FOR MANAGING SMART METERS

FIELD OF THE INVENTION

The present invention generally relates to the management and monitoring of smart meters. Smart meters are devices used for measuring the consumption of energy, fuel, electricity, water, etc or the use of appliances, cars, etc. In general a meter is a measurement device which can be used for billing a customers use, alert consumers of outages, monitor consumer consumption, etc. Smart meters are meters with some form of intelligence such as the ability to communicate with other devices.

BACKGROUND OF THE INVENTION

Regular meters are typically used in houses to measure the use of gas, electricity, water and other consumer products which are billed per used volume. For instance electricity is typically billed per kilowatt hour, water and gas per cubic meter, etc. The regular meters merely measure the use and display the amount used on a dial or display. A consumer, or a representative of the company which supplies the goods such as an electricity supplier has to perform a reading of that number at given points in time in order to monitor the consumption by the customer. The problem with such an approach is that it is very time consuming to obtain the meter values for all the customers of a large supplier and that either customers have to perform the readings themselves and report to the supplier or that the supplier needs a large number of representatives to perform the readings.

An alternative to the regular meters, is the use of smart meters which are able to communicate to the supplier. This way the supplier can obtain the meter value from each customer with little or no human interaction. The American patent U.S. Pat. No. 5,894,422 discloses a smart meter/billing system wherein smart meters are used to provide information to the supplier about the use of electric power by the customer. The patent describes the measurement of consumption per unit of time correlated to calendar-time, the demand for electric power, reliability, etc by the smart meters and then providing such information to the supplier. The supplier is then able to use information such as the consumption per unit of time at a particular calendar-time for billing purposes. It enables the supplier to charge a given price for the electricity based on the price of production at that specific calendar-time. By monitoring the demand for electricity and providing such information to the supplier, it is possible to take that information into account for billing as well. In addition such information can be used to perform load balancing on the electricity grid. For instance if the demand in a particular area rises, it can be detected by the measured demand of the smart meters in that particular area.

By enabling the supplier to take demand and production costs into account while billing for consumption, it becomes possible to move away from a business model wherein a fixed price is set for the consumption of electricity. However, this means that a customer is no longer aware of the current price of electricity, which may lead to unexpected bills and disputes between the customers and the suppliers. In order to avoid such problems, the suppliers may use a system which provides current price information to the customers.

An example of such system is disclosed in a US patent application US 2007/0136217 A1. In this patent application the distributor has two channels of providing price information to a terminal located at the consumer's premises. The terminal is able to display the price information and may control the power supply to various appliances based on the current price and other rules defined by the consumer. For instance the terminal may be able to switch an appliance on when the price is below a threshold but take into account the current time of day to avoid disturbance during the night.

The advantage of the above described solutions is that they no longer require a significant human effort to provide measurements to suppliers. Instead such information can be provided automatically or upon request by the smart meters. Although these solutions have been described with respect to electricity, the general concept of frequent measurements related to a given calendar-time, measurement of demand and providing price information to the consumer can be applied to any type of product, thus also water, gas, fuel, etc. However even when these solutions are applied to other fields of consumer products, their functionality is limited to measuring the consumption, the billing of consumption and providing pricing information to the user.

The prior art solutions are however limited in their functionality and cannot handle extensive business models or more complex tasks involving one or more smart meters. The prior art solutions are limited to reading information from a smart meter and processing that information for billing or load balancing and to provide pricing information to the customers.

It is an objective of the present invention to provide a way of managing and monitoring smart meters which is more flexible. It is another objective of the present invention to provide a way of performing complex tasks involving smart meters. It is another objective of the present invention to provide a more secure use of smart meters.

SUMMARY OF THE INVENTION

The drawbacks of the prior art are overcome and the objective of the present invention are realized by a management platform for monitoring and managing one or more smart meters, the management platform comprising means for communicating with the smart meters, characterized in that the management platform further comprises a workflow handler for executing a workflow, the workflow specifying a process for management of the smart meters.

Indeed, by having a workflow handler which executes workflows, it is possible to define tasks which involve smart meters and the processing of information obtained from these smart meters. The workflows which define a process for management of the smart meters define the various steps which are needed for a particular task. For instance there may be a workflow which produces billing information for a particular customer. Such a workflow may include steps such as determining all the smart meters related to that particular customer, obtaining a reading for each of those smart meters, determining the price of the delivered product such as electricity or water in the period which is billed and generating a bill based on the information. Another example of a workflow can be used when a customer moves from one location to another location. The workflow may retrieve identifications for all the smart meters related to the first location and the second location, initiate a suspension on the smart meters at the first location and activate the smart meters at the second location.

The workflow specifies which steps should be taken and the workflow handler executes the workflows upon request, with or without additional information. Some workflows, such as generating an alarm on certain conditions may not require additional information or input. However workflows which relate to a particular customer, location, smart meter, etc may require an identification of the object or person whereto they are related. The steps in a workflow may be defined by a supplier, for instance using a special user interface which allows a representative or personnel of the supplier to define each step. Alternatively, workflows may be defined automatically by the management platform or the workflow handler. For instance a workflow which reads all meters in a particular area may be partially defined by a human and partially automatically defined. A human can define a workflow which contains steps such as determining all smart meters present in a particular area and triggering another workflow for each of the smart meters in that area to obtain the reading. The triggered workflows for the readings are automatically provided with additional information required for their functionality.

Workflows may also specify how information should be processed. Data read from a smart meter needs to be processed to be useful. Thus, after reading the meter value, a workflow may specify which prices that should be applied to obtain a bill. The workflow may also specify that certain boundaries should be checked and an alarm may be raised if such boundaries are exceeded. For instance a user may have an average consumption of electricity and an alarm may be raised if consumption has exceeded that average by a certain percentage or value. Similarly the supplier may define alarm levels to detect abnormal high power consumptions on regular consumer lines to detect companies who attempt to use consumer prices instead of business prices.

In general the workflows describe the process required to obtain a particular result or perform a certain task. The management platform is able to execute such workflows and execute tasks listed therein. The management platform may be able to define workflows or sub-workflows based on other workflows, information received from a customer, supplier, smart meter or other systems, etc. to automate certain tasks or to facilitate certain tasks. The management platform is also able to communicate with the smart meters. This communication is important for reading data from the smart meters and for providing data to the smart meters. The smart meters may be connected to the management platform in various ways. For instance the smart meters and the management platform may all be connected to a public network such as the Internet which enables data exchange between the smart meters and the management platform. There may also be an access point at each consumers premises which gathers information from all the smart meters and interacts with the management platform through a public network. Alternatively there may be a private network which is only used for smart meter communication to which the meters and management platform are connection, or the power grid may be used for transporting the data between the smart meters and the management platform.

The type of connection between the management platform and the smart meters is of no relevance for the understanding of the present invention. In general the present invention only relies on the ability to exchange data between the management platform and the smart meters. It may be beneficial to use secure communication links between the management platform and the smart meters. Secure communication links can ensure that the information is genuine, which avoids attempts to provide false information to the supplier by malicious persons. In addition it may be beneficial to use reliable communication links. Having a good uptime of the communication links ensures that the smart meters are available to the management platform at all times. Having communication link failures may result in the loss of information, introduction of delays in billing, etc. which should be avoided.

Optionally the management platform according to the present invention further comprises an event scheduler for triggering the workflow handler at one or more time instances.

Tasks such as meter readings for billing, meter status checks, checking for possible upgrades for meter firmware, etc. are typically performed at regular time intervals.

The event scheduler enables the management platform to trigger the workflow handler for executing specific workflows which are related to such tasks. For instance the event scheduler may trigger the workflow handler once a month to perform a meter reading on all available meters and generate billing information for all the available meters.

Time instances can be regular time intervals or predefined points in time. The regular time intervals can be defined in terms of their reoccurrence such as every minute, hour, day, week, month or year or every number of minutes, hours, days, weeks, months or years. The events may also be scheduled to take place a predetermined period of time after a particular event. For instance a meter status check may automatically be scheduled five minutes after a meter has been reset or upgraded.

Optionally the management platform according to the present invention further comprises means for receiving and processing event notifications from the meters and/or the workflow handler and/or the event scheduler.

Further optionally in the management platform according to the present invention, the event notifications comprise information related to one or more of the following:
value reading of the meters;
configuration of the meters;
reset of the meters;
tampering with the meters;
supply status of the meters
firmware and/or software upgrade of said meters;
an event occurring at said meters;
actions taken upon an event occurring at said meters; and
status of the meters.

Smart meters may generate event reports which can be communicated back to the management platform. Such reports can be used by the management platform to maintain an overview of the current status of the smart meter but can also be used to alert the management platform of particular problems that may arise at the smart meter. Smart meters may for instance notify the management platform that a supply outage has occurred or that the supply has been restored, that a customer has attempted to tamper with a meter, etc. Such reports may trigger a workflow in response at the management platform. For instance when a supply outage occurs, the management platform may notify a representative of the supplier or operator in order for them to resolve the problem. The management platform may be able to give a detailed report based on the identification of the smart meter which issues the event notification and the contents of that event notification. For instance if the event notification specifies that there has been a tamper attempt, the management platform may be able to provide that information along with the address where the attempt has taken place to a representative.

Event notifications which can be processed by the management platform may also be generated as responses to workflows. For instance when the workflow for a meter reading has been triggered, the current meter value can be sent to the management platform as an event notification, rather than as regular information. There may also be a difference between various types of a particular event. A meter can be read upon request by the management platform but may also be read as scheduled or upon interaction from the customer with a smart meter. These different types of reads may result in the same event notification which passes the meter value or they may all have their own notification information with additional information. Especially when user interaction is involved, it may be important to have more information available than just the meter value. This way it is possible to avoid malicious intent from customers who send their meter value to the management platform at a point in time which is too early, for instance in an attempt to have one or more days of consumption not billed.

Event notifications may also be received from the event scheduler or the workflow handler. For instance while executing a particular workflow, an error may occur such as a smart meter which is not available or malfunctions. The workflow handler is then unable to execute the workflow correctly and can generate an event notification which in turn can be used to investigate the problem. Similarly the event scheduler may be able to generate event notifications during the execution of scheduled events with results thereof.

Optionally the management platform according to the present invention further comprises an access interface for controlling said platform.

Further optionally according to the present invention, the access interface is one or more of the following:
  a web interface accessible to customers;
  a web interface accessible to representatives of an operator or supplier; and
  a Service Oriented Architecture Protocol (SOAP) interface accessible to the representatives.

The management platform is able to interact with the smart meters which provides basic functionality and management abilities of the smart meters. However it may be beneficial to provide an access interface which enables interaction of users such as customers, consumers, representatives of an operator or supplier, etc. to control the management platform. An access interface such as a web interface provides an easy to use interface for the users. It can provide information to the users automatically such as important event notifications or upon request by the user. It may also enable a user a way of entering information which is needed for the execution of particular workflows or the manual triggering of the workflow handler to execute particular workflows.

The web interface for customers may be limited to presenting information such as the status of the smart meters in the customers premises, the consumption over time by the customer, etc. However the web interface may also provide a way of controlling the management platform by the customer, for instance to request firmware upgrades for a particular smart meter, to receive a billing overview ahead of time, activate or deactivate smart meters in the premises, etc. Similarly the representatives of the operator or supplier may be able to control particular smart meters, groups of smart meters, etc. using a web interface.

Alternatively to a web interface, the management platform may also be controlled using a software platform which is designed to interact with the management platform. Using a service oriented architecture protocol (SOAP) interface may provide a convenient way of interacting with the management platform by other platforms such as supplier control platforms, backoffice systems, etc. Other protocols may also be used to define an access interface to the management protocol which can be used by other applications to interact with the management platform. Such systems may for instance be used to provide web interfaces on a system which is not part of the management platform itself but which can interact with the management platform. For instance a government may order the installation of smart meters in all premises in the country and keep a nation-wide management platform. The various suppliers of goods such as gas, water and electricity may provide their own systems with web interfaces to their respective customers. Their own systems can then interact with the management platform to obtain data and perform certain tasks which are allowed by the nation-wide management platform.

Optionally in the management platform according to the present invention, the means for communicating are adapted for exchanged information between the platform and the meters based on one or more of the following
  the ANSI C12.x protocol;
  Fe TR-069 protocol;
  Simple Network Management Protocol (SNMP); and
  file transfer; and
  Service Oriented Architecture Protocol (SOAP); and
  Device Language Message Specification (DLMS).

Various protocols exist which can be used for communication between two devices. Smart meters are typically adapted for using a specific protocol such as a variant of the ANSI C12.x protocol or the Device Language Message Specification (DLMS) which is also known as the IEC62056 protocol. These protocols typically define how a device can communicate with a smart meter, and every smart meter which supports either of these protocols can be addressed and interacted with in the same way. Thus, by supporting standardized protocols on the management platform and the smart meters, it is possible to interact with new smart meters which are brought onto the market without adapting the management platform.

Other protocols such as the SOAP protocol, SNMP and the TR-069 protocol are more generic protocols which are designed to enable interaction between devices but without specifically being designed for concepts such as smart meters. Thus these protocols can be used to transport information between the management platform and the smart meters in a standardized way but the implementation of the data exchange itself is dependant on the vendor and platform developer. This means that any management platform which is able to use protocols such as SOAP, SNMP and TR-069 will be able to communicate with smart meters supporting these protocols, but which information is exchanged and how needs to be defined for each vendor specifically. It may be possible to define a standard based on such protocols which is used by all vendors. Such a standard would reduce the complexity of the management platform significantly when a large number of vendor equipment has to be supported.

Smart meters may also be able to dump their information in a file, which can be limited to a specific piece of information or which can be made up out of a number of pieces of information. Such files may be the information or may be well defined in for instance an eXtensible Markup Language (XML). Using XML allows the use of a single file which can contain all the data that is to be sent to the smart meter or retrieved from the smart meter. Without using a structured file, the management platform needs an ability to parse various types of files, which may result in the need of a large number of parsers specific for a particular file. A single XML parser could be used to retrieve the information from a file consisting of XML tags, and any new tags could easily be added to the existing parser without the need of implementing a new parser for a new piece of information.

Of course it is also possible to use a proprietary protocol for interaction between the management platform and the smart meters. Each vendor of smart meters may define his own protocol which means that the management platform needs to support such vendor specific protocols. It should be obvious to the person skilled in the art that the exact protocol which is used for communication between the management platform and the smart meter is of no importance to the present invention. It is however important for the present invention to be able to communicate with the smart meters, regardless of the protocols used. It is beneficial to support as many protocols on the management platform as there are available on smart meters in order to be able to manage and monitor the widest range of smart meters with the same management platform.

The present invention further relates to a method for managing smart meters with a management platform, the management platform comprising means for communicating with the smart meters, characterized in that the method comprises executing a workflow by a workflow handler on the management platform, the workflow specifying a process for management of the smart meters.

DETAILED DESCRIPTION OF EMBODIMENT(S)

Figure 1:
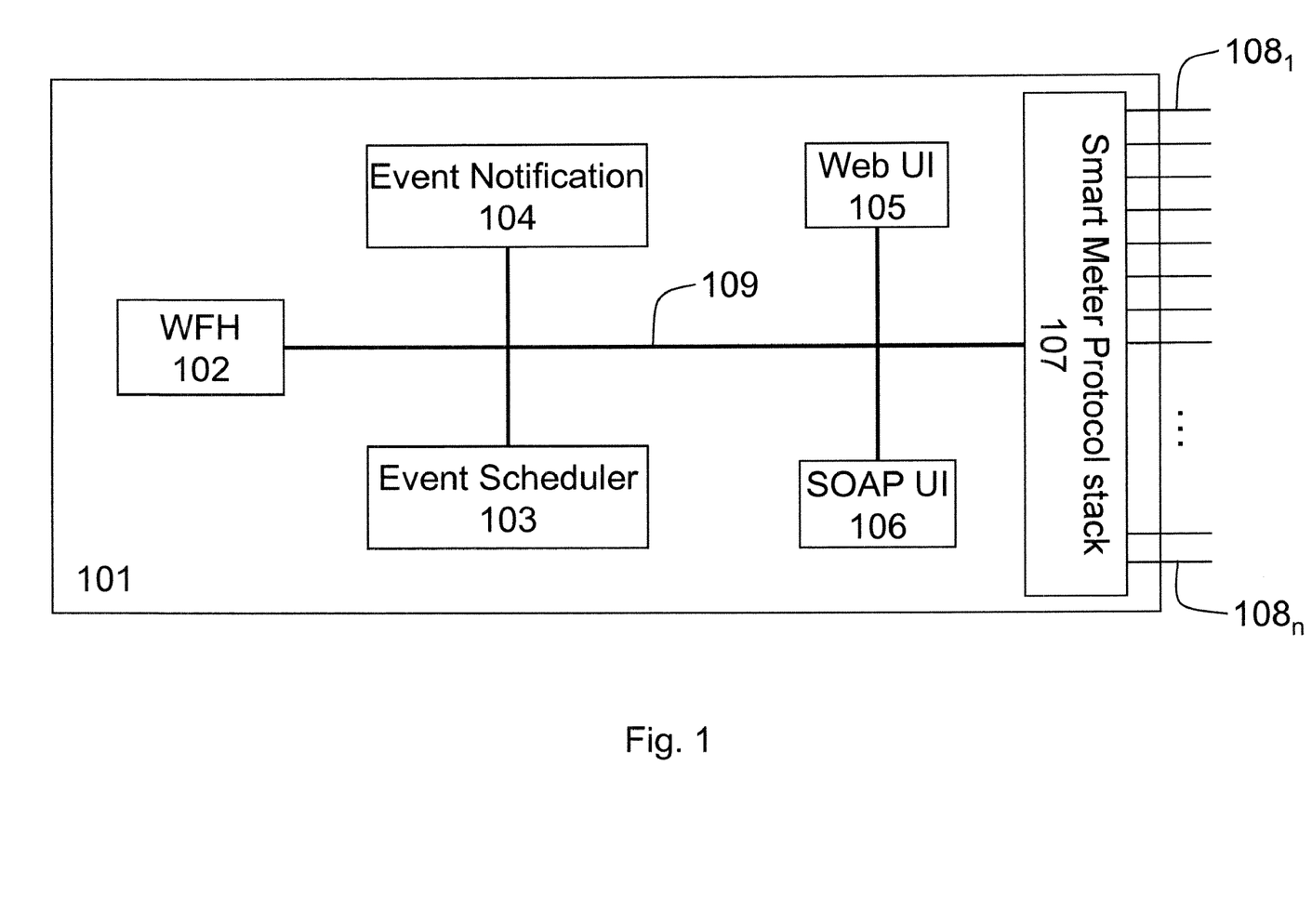
FIG. 1 illustrates an embodiment of the present invention.

FIG. 1 illustrates a block diagram of an embodiment of the present invention. FIG. 1 shows a management platform 101 with a WorkFlow Handler (WFH) 102, an Event Scheduler module 103, an Event Notification module 104, a Web User Interface (Web UI) module 105, a SOAP User Interface (SOAP UI) 106 and a smart meter protocol stack module 107. The modules are all interconnected via link 109 and the smart meter protocol stack 107 is further connected to a number of smart meters via connections $108_1$ to $108_n$.

In this particular example the management platform 101 is implemented as software on an existing service delivery platform such as the Open Services Platform (OSP) from Alcatel-Lucent. Such OSP allows the design and implementation of applications on an existing architecture. This enables the designers of the management platform to concentrate on the management platform itself without considering implications of designing a platform such as an OSP. The WFH 102 processes workflows which may be stored in a memory either internal to the WFH 102 or an external memory which is not shown in FIG. 1. An external memory may be shared with other modules and may be connected to the link 109 or may be connected directly to the WFH 102.

The WFH 102 may be triggered for instance by users via Web UI 105 or other applications via SOAP UI 106 or the WFH 102 may be triggered by the event scheduler 103. In addition, the WFH 102 may also be triggered by the event notification module 104.

The event scheduler 103 is able to track the current day and time and is aware of workflows that need to be executed at particular time instances. The event scheduler 103 is for instance able to trigger a meter reading on all the meters in one particular premises every month and that for all premises which need to be billed on a monthly basis. Similarly the event scheduler 103 may perform a status check of each smart meter once a week to check for problems and possibly firmware upgrades. The event scheduler may also provide regular usage information to smart meters to enable the users thereof to monitor their usage. The event scheduler 103 is aware of the time whereon these workflows have to be executed either because of the regular time interval at which the workflows have to be executed or because of the specific time and date whereon the execution is scheduled. The event scheduler 103 can send a signal to the WFH 102 to trigger the execution of a particular workflow and may provide all the information needed to execute that workflow to the WFH 102. Alternatively the workflow contains instructions to obtain information from other sources such as a memory in the management platform or a source external to the management platform.

The event notification module 104 receives event messages from the meters, the WFH 102 and the event scheduler 103 and processes such event messages. Each event message or event notification relates to a particular event such as meter readings, meter configuration changes, meter status, meter reset events, meter firmware upgrades, etc. Every action performed by the WFH 102, the event scheduler 103 and the smart meters may produce a notification event. Similarly actions via one of the user interfaces 105 and 106 may also produce a notification event which is sent to the event notification module 104. Upon receipt of such an event notification, the event notification module 104 can process the event and perform particular actions. For instance if a smart meter sends a notification indicating that there is a supply outage, the event notification module 104 may trigger a workflow related to a supply outage. Such workflow may then present a warning via one of the user interfaces 105 and 106 to a user or representative of the supplier or provider. The management platform 101 may also have a connection to a Short Messaging Service (SMS) interface. This way the management platform is able to send an SMS to an operator, a representative or a consumer in case of a particular event. For instance the consumer may be notified that his power consumption is above average or that it is time to provide a meter reading to the operator or supplier. Similarly the management platform may also be able to notify people via email, an automated telephone system or warnings presented via dedicated software tools executed on a users computer or a backoffice system.

The user interfaces 105 and 106 provide a way of interacting with the management platform 101 to users, consumers, backoffice personnel, representatives, operators, etc. Especially web interface 105 is suited for human interaction because a web interface typically presents an orderly overview of the system and possible interactions with the management platform 101. SOAP interfaces can typically be used to provide easy access to the management platform to other platforms such as software tools, web interfaces executed on systems external to the management platform 101, etc. In addition to a web interface 105 and a SOAP interface 106, there may also be additional interfaces. For instance the management platform 101 may also be able to receive instructions via SMS using an SMS interface or via a telephone call. The management platform may provide a telephone interface whereon a telephonic menu is played to the caller, which in turn can use keys of a telephone to enter his selection and thus provide instructions to the management platform. Of course such an SMS and telephone interface may also be separate devices which are able to interact with the management platform 101 via the SOAP interface 106 or another, not illustrated, interface supporting SOAP or a dedicated protocol.

The smart meter protocol stack 107 provides a connection between the management platform 101 and the smart meters connected to the management platform 101 via links $108_1$ to $108_n$. Although FIG. 1 illustrates a number of links between the management platform 101 and the smart meters, there may in fact be only a single physical link from the management platform to a distribution system which interconnects the smart meters and the management platform. In such case each connection to a particular smart meter can be considered as a virtual link from the management platform to the smart meter and all such virtual links are aggregated onto that single physical link. Of course the management platform may have more than one physical links but less than the total number of smart meters being monitored and managed. In such case the management platform may balance the load over multiple physical links. Alternatively there may be a physical link per group of meters, or a smaller number of physical links whereon each link supports a number of groups of meters.

The smart meter protocol stack 107 provides a gateway between the internal operation of the management platform 101 and the smart meters. The protocol stack 107 is able to communicate with the smart meters using one or more communication protocols such as ANSI C12.x, TR-069, SNMP, DSLM, etc. The protocol stack can receive instructions from the modules in the management platform 101 and convert such instructions into messages for transport on the links $108_1$ to $108_n$ in the appropriate protocol. In one embodiment, the protocol stack 107 is able to determine which protocol is used to communicate with a particular smart meter. In an alternative embodiment the WFH 102 provides information related to the protocol to the protocol stack 107.

It should be noted that although FIG. 1 illustrates various modules as separate modules, it may be possible to integrate functionality of various modules into a single module. For instance the event scheduler may be part of the WFH and the protocol stack may also be integrated into the WFH. There may also be multiple instances of the same modules in the management platform. There may for instance be an event scheduler for events which occur at time intervals and there may be a separate event scheduler for events that occur on a predefined time and date. Similarly the user interfaces may not be part of the management platform itself and may be provided by external systems. In such case the management platform provides an interface for such external systems to interact with the management platform.

Figure 2:
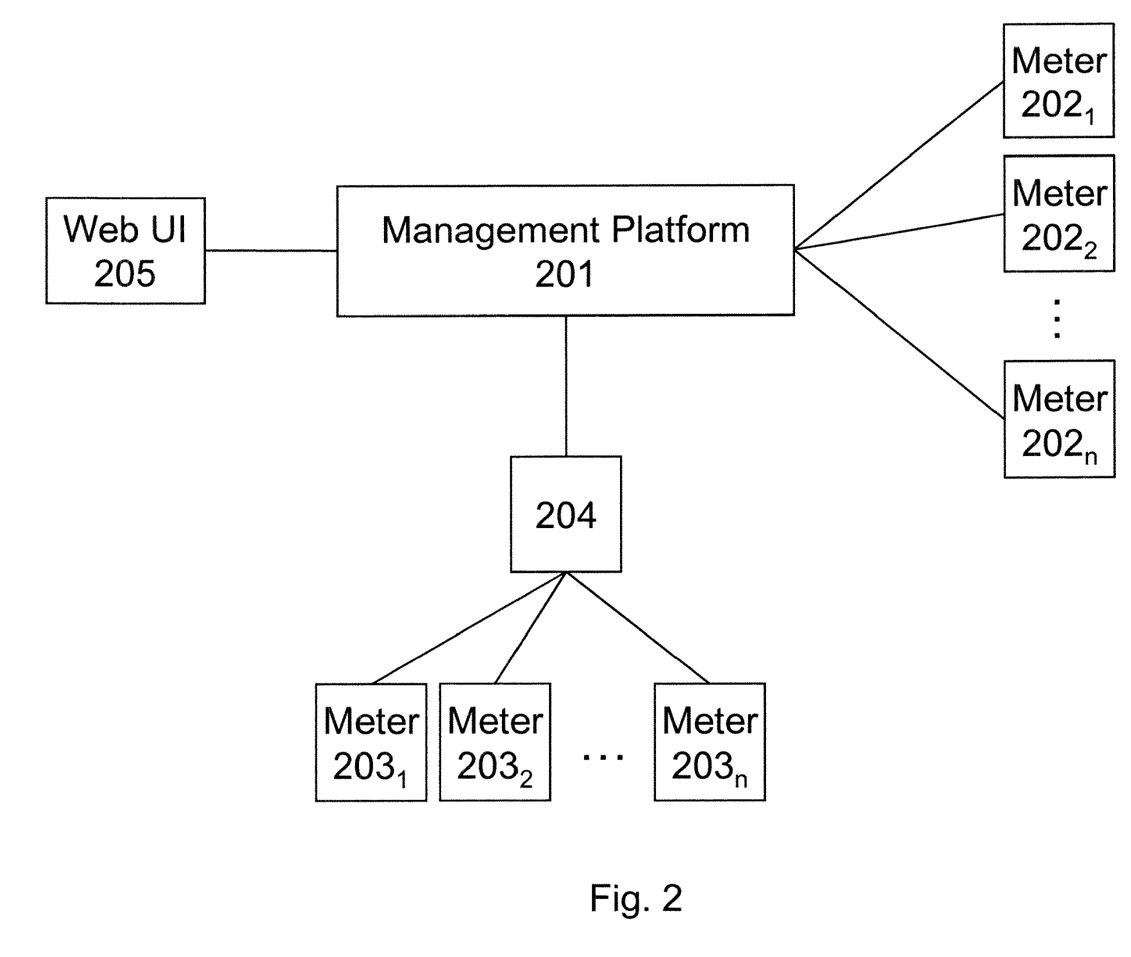
FIG. 2 illustrates an overview of a scenario wherein an embodiment of the present invention is used.

FIG. 2 illustrates a use-case scenario of an embodiment of the present invention. FIG. 2 shows a management platform 201 which may be the management platform as described with respect to FIG. 1 or may be an alternative embodiment thereof. The management platform 201 is connected to a first set of smart meters $202_1$ to $202_n$ directly. In addition, the management platform 201 is also connected to a second set of smart meters $203_1$ to $203_n$ but via an intermediate device 204. Such intermediate device can for instance be a home gateway which provides network access to all the smart meters and aggregates the traffic onto a single communication line towards the management platform 201. Such a gateway device 204 may also be a proprietary device from a supplier or vendor which is able to communicate with all the smart meters at a premises and the management platform 201. The management platform 201 is further connected to a Web user interface 205 which is external to the management platform 201 itself. This web UI 205 can be accessed by the consumers of a particular supplier and presents them with information related to their usage, meters and supplier.

The type of connection between the meters is of no importance for the understanding of the present invention. However typically such connections can be wired connections such as the power grid wires or existing network cabling. This is especially possible if the use of smart meters was intended during the construction or renovation of a premises as this allows for placing cables for such smart meters in walls, floors, etc. However when changing meters in a premises, it may be more convenient to use wireless smart meters which can communicate with the management platform 201 via a wireless communication link, either directly or via a wireless access point such as gateway device 204.

Although FIG. 2 only illustrates two sets of smart meters, this should only be considered as an example. There may be a larger number of smart meters connected directly to the management platform or via one or more gateway devices. For instance each premises may have a number of smart meters and a single gateway device which is connected to the management platform. The connection between the management platform and the smart meters may be directly or via one or more intermediate nodes such as via a typical access network which involves a number of routers and switches.

Although the present invention has been illustrated by reference to specific embodiments, it will be apparent to those skilled in the art that the invention is not limited to the details of the foregoing illustrative embodiments, and that the present invention may be embodied with various changes and modifications without departing from the spirit and scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the spirit and scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfill the functions of several means recited in the claims. Any reference signs in the claims shall not be construed as limiting the respective claims concerned. The terms "first", "second", and the like, when used in the description or in the claims are introduced to distinguish between similar elements or steps and are not necessarily describing a sequential or chronological order. It is to be understood that the terms so used are interchangeable under appropriate circumstances and embodiments of the invention are capable of operating according to the present invention in other sequences, or in orientations different from the one(s) described or illustrated above.

The invention claimed is:

1. A management platform for monitoring and managing one or more smart meters, comprising:
    a workflow handler for executing one or more of a plurality of workflow processes for management of said smart meters in conjunction with delivery of a volume-based consumable product to one or more customer premises associated with the one or more smart meters;
    a smart meter interface operable to communicate with the one or more smart meters and the workflow handler for receiving event notifications from the one or more smart meters, wherein the event notifications include status information associated with delivery of the volume-based consumable product to the corresponding customer premises;
    an event notification module operable to communicate with the smart meter interface and the workflow handler for processing the event notifications to evaluate the status information, select a workflow process to handle the event notifications based at least in part on the corresponding status information, and initiate the selected workflow process at the workflow handler to manage delivery of the volume-based consumable product in response to the corresponding event notification; and a processor configured to execute the workflow handling and event notification module;

wherein the event notification module evaluates the status information in a first event notification from a first smart meter, determines the status information indicating a first customer associated with the first smart meter is moving from a first premises to a second premises associated with a second smart meter, selects a first workflow process to suspend the first smart meter and a second workflow process to activate the second smart meter, and initiates the first and second workflow processes at the workflow handler to manage delivery of the volume-based consumable product to the first customer in conjunction with the move.

2. The management platform according to claim 1, further comprising:

an event scheduler module for triggering said workflow handler to execute one or more of the plurality of workflow processes at one or more time instances;

wherein the event notification module is also for receiving and processing event notifications from the event scheduler module;

wherein the event notification module evaluates the status information in a first event notification from the event scheduler module, determines the status information identifies a first time instance for a smart meter status check, selects a first workflow process for performing a status check of the one or more smart meters, and initiates the first workflow process at the workflow handler to perform the status check on the one or more smart meters in relation to the first time instance.

3. The management platform according to claim 1 wherein the event notification module is also for receiving and processing event notifications from said workflow handler;

wherein the event notification module evaluates the status information in a first event notification from the workflow handler, determines the status information indicates the workflow handler encountered a problem and was not able to execute a first workflow process correctly, selects a second workflow process for investigating the problem, and initiates the second workflow process at the workflow handler to begin investigating the problem.

4. The management platform according to claim 1, further comprising:

an access interface for controlling said platform.

5. The management platform according to claim 4, said access interface comprising one or more of the following:

a web interface accessible to customers;

a web interface accessible to representatives of an operator or supplier;

a Service Oriented Architecture Protocol (SOAP) interface accessible to said representatives;

a short messaging service (SMS) interface;

an e-mail interface; and a telephone system interface.

6. The management platform according to claim 1, said event notifications comprising status information related to one or more of the following:

configuration of said meters;

reset of said meters;

tampering with said meters;

supply status of said meters;

firmware and/or software upgrade of said meters;

an event occurring at said meters;

actions taken upon an event occurring at said meters; and status of said meters.

7. The management platform according to claim 1 wherein the smart meter interface is configured to provide communications between said platform and said meters based on one or more of the following communication standards:

an ANSI C12.x protocol;

a TR-069 protocol;

an Simple Network Management Protocol (SNMP);

a file transfer protocol;

a Service Oriented Architecture Protocol (SOAP);

a Device Language Message Specification (DLMS); and an eXtensible Markup Language (XML) file.

8. The management platform according to claim 1 wherein the event notification module evaluates the status information in a first event notification from a first smart meter, determines the status information indicates delivery of the volume-based consumable product to a first premises has exceeded an average volume by a predetermined percentage, selects a first workflow process for notifying a first customer associated with the first premises of the above average consumption, and initiates the first workflow process at the workflow handler to notify the first customer of the above average consumption.

9. The management platform according to claim 1 wherein the event notification module evaluates the status information in a first event notification from a first smart meter, determines the status information indicates a supplier-related condition that includes a supply outage of the volume-based consumable product to a first premises, a supply restoration of the volume-based consumable product to the first premises, or a potential unauthorized tampering with the first smart meter, selects a first workflow process for notifying a representative of the supplier or an operator associated with supplying the volume-based consumable product to the first premises of the supplier-related condition, and initiates the first workflow process at the workflow handler to notify the representative of the supplier-related condition.

10. The management platform according to claim 1 wherein the smart meter interface is operable to communicate with at least one smart meter via an intermediate device that serves as a gateway between the management platform and the at least one smart meter.

11. A method for managing smart meters with a management platform, comprising:

executing, by a processor, one or more of a plurality of workflow processes at a workflow handler associated with said management platform for management of said smart meters in conjunction with delivery of a volume-based consumable product to one or more customer premises associated with the smart meters;

receiving event notifications at the management platform from the smart meters, wherein the event notifications include status information associated with delivery of the volume-based consumable product to the corresponding customer premises;

processing, by the processor, the event notifications at an event notification module associated with the management platform to evaluate the status information;

selecting a workflow process at the event notification module to handle the event notifications based at least in part on the corresponding status information;

initiating the selected workflow process at the workflow handler to manage delivery of the volume-based consumable product in response to the corresponding event notification;

evaluating the status information in a first event notification from a first smart meter at the event notification module;

determining the status information indicating a first customer associated with the first smart meter is moving from a first premises to a second premises associated with a second smart meter;

selecting a first workflow process to suspend the first smart meter and a second workflow process to activate the second smart meter; and initiating the first and second workflow processes at the workflow handler to manage delivery of the volume-based consumable product to the first customer in conjunction with the move.

12. The method according to claim 11, further comprising:

evaluating the status information in a first event notification from a first smart meter at the event notification module;

determining the status information indicates delivery of the volume-based consumable product to a first premises has exceeded an average volume by a predetermined percentage;

selecting a first workflow process for notifying a first customer associated with the first premises of the above average consumption; and initiating the first workflow process at the workflow handler to notify the first customer of the above average consumption.

13. The method according to claim 11, further comprising:

evaluating the status information in a first event notification from a first smart meter at the event notification module;

determining the status information indicates a supplier-related condition that includes a supply outage of the volume-based consumable product to a first premises, a supply restoration of the volume-based consumable product to the first premises, or a potential unauthorized tampering with the first smart meter;

selecting a first workflow process for notifying a representative of the supplier or an operator associated with supplying the volume-based consumable product to the first premises of the supplier-related condition; and initiating the first workflow process at the workflow handler to notify the representative of the supplier-related condition.

14. The method according to claim 11, further comprising:

triggering the workflow handler from an event scheduler module to execute one or more of the plurality of workflow processes at one or more time instances;

receiving a first event notification at the event notification module from the event scheduler module, wherein the first event notification includes status information;

evaluating the status information in the first event notification at the event notification module;

determining the status information identifies a first time instance for a smart meter status check;

selecting a first workflow process for performing a status check of the one or more smart meters; and initiating the first workflow process at the workflow handler to perform the status check on the one or more smart meters in relation to the first time instance.

15. The method according to claim 11, further comprising:

receiving a first event notification at the event notification module from the workflow handler, wherein the first event notification includes status information;

evaluating the status information in the first event notification at the event notification module;

determining the status information indicates the workflow handler encountered a problem and was not able to execute a first workflow process correctly;

selecting a second workflow process for investigating the problem; and initiating the second workflow process at the workflow handler to begin investigating the problem.

16. A method for monitoring and managing one or more smart meters, comprising:

initiating, by a processor, a first workflow process at a workflow handler associated with a management platform to monitor delivery of a volume-based consumable product to a customer premises;

receiving a first event notification at the management platform from a first smart meter located at the customer premises, wherein the first event notification includes first status information associated with delivery of the volume-based consumable product to the customer premises;

processing, by the processor, the first event notification at an event notification module associated with the management platform to evaluate the first status information;

selecting a second workflow process at the event notification module to handle the first event notification based at least in part on the first status information;

initiating the second workflow process at the workflow handler to manage delivery of the volume-based consumable product in response to the first event notification;

determining the status information in the first event notification indicating a first customer associated with the first smart meter is moving from a first premises to a second premises associated with a second smart meter;

selecting the second workflow process to suspend the first smart meter and a third workflow process to activate the second smart meter; and initiating the second and third workflow processes at the workflow handler to manage delivery of the volume-based consumable product to the first customer in conjunction with the move.

17. The method according to claim 16, further comprising:

determining the status information in the first event notification indicates delivery of the volume-based consumable product to a first premises has exceeded an average volume by a predetermined percentage;

selecting the second workflow process for notifying a first customer associated with the first premises of the above average consumption; and initiating the second workflow process at the workflow handler to notify the first customer of the above average consumption.

18. The method according to claim 16, further comprising:

determining the status information in the first event notification indicates a supplier-related condition that includes a supply outage of the volume-based consumable product to a first premises, a supply restoration of the volume-based consumable product to the first premises, or a potential unauthorized tampering with the first smart meter;

selecting the second workflow process for notifying a representative of the supplier or an operator associated with supplying the volume-based consumable product to the first premises of the supplier-related condition; and initiating the second workflow process at the workflow handler to notify the representative of the supplier-related condition.

19. The method according to claim 16, further comprising:

triggering the workflow handler from an event scheduler module to execute one or more of a plurality of workflow processes at one or more time instances;

receiving a second event notification at the event notification module from the event scheduler module, wherein the second event notification includes status information;

evaluating the status information in the second event notification at the event notification module;

determining the status information identifies a first time instance for a smart meter status check;

selecting a third workflow process for performing a status check of the one or more smart meters; and initiating the third workflow process at the workflow handler to perform the status check on the one or more smart meters in relation to the first time instance.

20. The method according to claim 16, further comprising:

receiving a second event notification at the event notification module from the workflow handler, wherein the second event notification includes status information;

evaluating the status information in the second event notification at the event notification module;

determining the status information indicates the workflow handler encountered a problem and was not able to execute the first or second workflow process correctly;

selecting a third workflow process for investigating the problem; and initiating the third workflow process at the workflow handler to begin investigating the problem.

* * * * *